(No Model.)
R. BINNIE.
HAND DRILL.
No. 545,335. Patented Aug. 27, 1895.
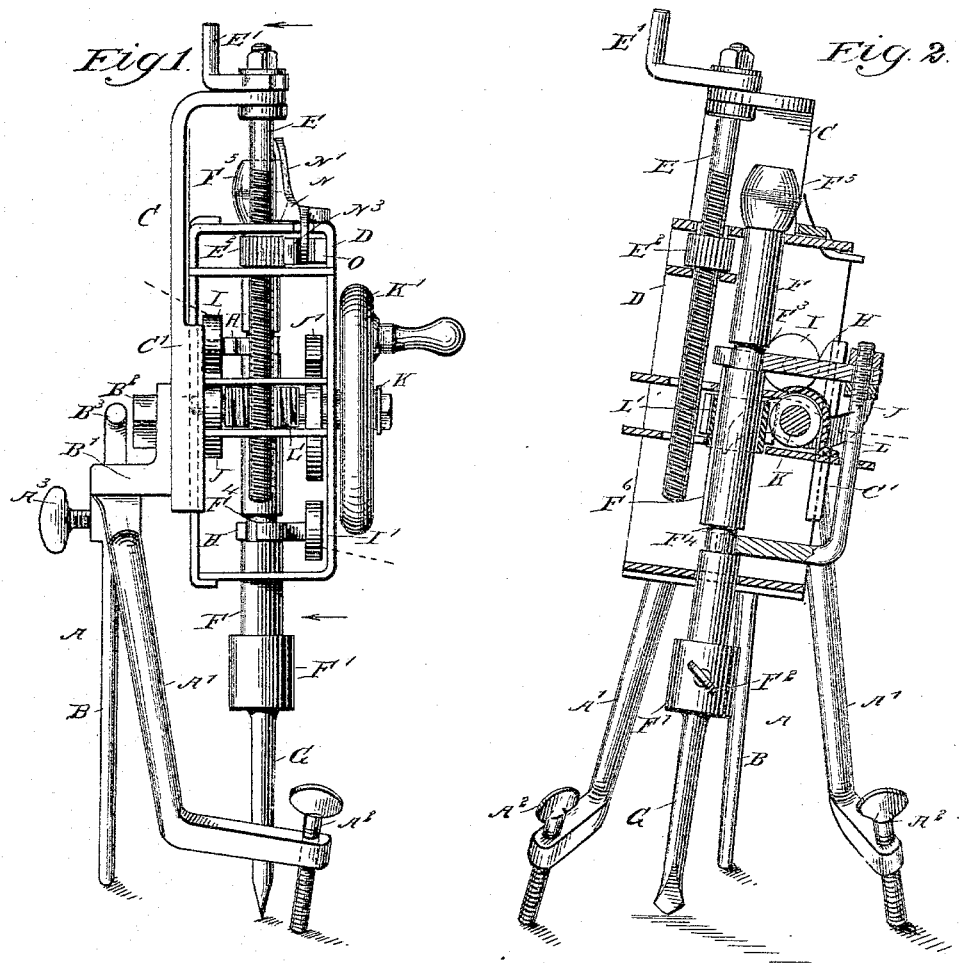
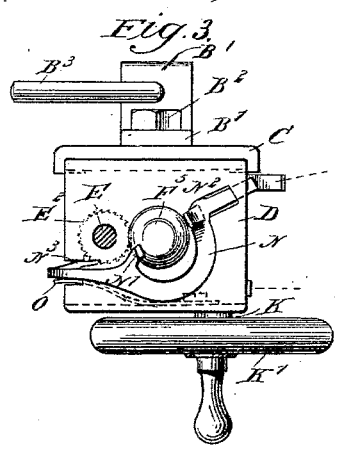
WITNESSES:
Edward C. Rowland.
Theo. G. Hoster
INVENTOR
R. Binnie
BY
Munn & Co.
ATTORNEYS.

UNITED STATES PATENT OFFICE.

ROBERT BINNIE, OF BOLIVAR, PENNSYLVANIA.

HAND-DRILL.

SPECIFICATION forming part of Letters Patent No. 545,335, dated August 27, 1895.

Application filed March 26, 1895. Serial No. 543,228. (No model.)

*To all whom it may concern:*

Be it known that I, ROBERT BINNIE, a subject of the Queen of Great Britain, at present residing in Bolivar, in the county of Westmoreland and State of Pennsylvania, have invented a new and Improved Hand-Drill, of which the following is a full, clear, and exact description.

The object of the invention is to provide a new and improved hand-drill which is simple and durable in construction, very effective in operation in any desired position, and arranged to permit of drilling at any angle and without danger of the drilling-tool getting stuck in the hole.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is an end elevation of the improvement. Fig. 2 is a sectional front view of the same, and Fig. 3 is a plan view of the improvement with part in section.

The improved hand-drill is provided with a tripod A, preferably made with a double leg A', carrying at its feet screws $A^2$, and a single leg B, held adjustable in the middle portion of the double leg A' and adapted to be secured therein by a set-screw $A^3$. On this leg B is secured an angle-iron B', on which is fastened by a bolt $B^2$ a frame C, provided with guideways C', in which is fitted to slide a carriage D, adapted to be raised and lowered by a feed-screw E, mounted to turn in the frame C and carrying at its upper end a handle E', adapted to be taken hold of by the operator to turn the said feed-screw and raise and lower the carriage D by hand whenever desired. The feed-screw E screws in a nut $E^2$, held loosely between two arms of the carriage D, so that the latter moves with the nut $E^2$ as the said nut screws up or down on the feed-screw E at the time the latter is turned. On the other hand, if the nut $E^2$ is turned a like movement is given to the carriage D, and for this purpose the nut $E^2$ is made in the shape of a ratchet, as indicated in the drawings. An intermittent turning motion is given to the nut $E^2$ in the manner hereinafter more fully described, so as to automatically feed the carriage during the drilling process.

In the carriage D is mounted to turn and to slide a drill-shaft F, formed at its lower end with a socket F', in which is adapted to be fastened by a set-screw $F^2$ or other means a drilling-tool G. The shaft F is provided with reduced journals $F^3$ and $F^4$, mounted in a frame H, adapted to slide, and carrying wheels I and I', adapted to be engaged alternately by S-shaped cams J and J', respectively, secured on a transversely-extending driving-shaft K, journaled in suitable bearings in the carriage D. On the outer end of this shaft K is secured a hand-wheel K', adapted to be turned so as to rotate the shaft K and cause the cams J and J' to alternately engage the wheels I and I' to impart an up-and-down or a forward-and-backward sliding motion to the frame H, so that the latter moves the feed-drill shaft F in the same direction.

On the driving-shaft K is secured a worm L in mesh with a worm-wheel L', through which passes the drill-shaft F, and which is engaged at a longitudinal groove by a key $F^6$, secured on the drill-shaft F. Now, when the driving-shaft K is rotated, the worm L will turn the worm-wheel L' and consequently the drill-shaft F, at the same time permitting the latter to slide up and down or forward and backward in the worm-wheel L', which latter is held between two bars of the carriage D. (See Fig. 2.) The extreme upper end of the drill-shaft F is provided with a double cone-shaped head $F^5$, adapted to alternately engage the arms N' and $N^2$, projecting from a pawl N, mounted to slide on the carriage D and provided with a pawl-arm $N^3$, adapted to engage the teeth of the ratchet-nut $E^2$, and in which screws the feed-shaft E, as previously mentioned. A spring O presses on the pawl-arm $N^3$, so as to hold the latter in contact with the teeth of the ratchet-nut $E^2$.

The operation is as follows: When the several parts are in the position illustrated in the drawings and the shaft K is turned, the S-shaped cams J and J' impart a sliding motion to the drill-shaft F, so as to cause the drilling-tool G to drill a hole whether the carriage D is in a vertical position for drilling up or down or in a horizontal position. Besides the sliding motion given to the shaft F an intermittent rotary motion is given the same by the worm L and worm-wheel L', and a feed-motion is given to the carriage D and the parts mounted thereon from the said drill-shaft by the head $F^5$ alternately engaging the arms N' and $N^2$ to move the pawl N forward and backward to turn the ratchet-nut $E^2$. Now, it will be seen that by the arrangement described a very uniform motion is given to the drill-shaft F and the tool G carried thereby, so that the said drilling-tool is not liable to get stuck in the hole, as the shaft F is turned at each stroke. It will further be seen that the entire hand-drill is very simple and durable in construction, can be readily set in any desired position or moved about from place to place.

Having thus fully described my invention, I claim as new and desire to secure by Letters Patent—

1. In a drill, the combination with a frame and a carriage mounted thereon, of a drill shaft mounted in the carriage, a sliding frame secured to the drill shaft and provided with wheels, a driving shaft, cams on the driving shaft and engaging the wheels of the sliding frame, a worm on the driving shaft, and a worm wheel in which the drill shaft slides, the said shaft having a key and groove connection with the said worm wheel, substantially as described.

2. In a drill, the combination with a frame, and a carriage fitted to slide thereon, of a ratchet nut mounted in the carriage, a feed screw mounted in the frame and passing through the ratchet nut, a reciprocating drill shaft having a double cone shaped head, and a sliding pawl mounted on the carriage and adapted to be alternately engaged by the head of the drill shaft, substantially as described.

3. In a drill, the combination with a frame and a carriage fitted to slide thereon, of a ratchet nut mounted in the carriage, a feed screw mounted in the frame and working in the ratchet nut, a reciprocating drill shaft having a double coned head, and a spring pressed and sliding pawl mounted on the carriage and provided with two arms alternately engaged by the head of the drill shaft, substantially as described.

4. In a drill, the combination with a frame and a carriage mounted thereon, of a drill shaft mounted in the carriage and having a double cone shaped head, a sliding frame secured to the drill shaft, cams on the driving shaft for engaging the said sliding frame, a worm on the driving shaft, a worm wheel in which the drill shaft slides, a ratchet wheel on the drill shaft, and a sliding pawl engaging the ratchet wheel and operated by the head of the drill shaft, substantially as described.

ROBERT BINNIE.

Witnesses:
H. E. MILLER,
W. I. ROBINSON.